(12) United States Patent
Tasaki et al.

(10) Patent No.: US 7,722,961 B2
(45) Date of Patent: May 25, 2010

(54) RESIN COMPOSITION AND STRETCHED FILM OBTAINED BY USING THE SAME

(75) Inventors: Tsutomu Tasaki, Ichihara (JP); Toshihiro Nishimura, Ichihara (JP); Hiroshi Inoue, Ichihara (JP)

(73) Assignee: Prime Polymer Co., Ltd., Tokyo (JP)

( * ) Notice: Subject to any disclaimer, the term of this patent is extended or adjusted under 35 U.S.C. 154(b) by 102 days.

(21) Appl. No.: 10/572,385

(22) PCT Filed: Sep. 17, 2004

(86) PCT No.: PCT/JP2004/013660
§ 371 (c)(1),
(2), (4) Date: Mar. 16, 2006

(87) PCT Pub. No.: WO2005/028553
PCT Pub. Date: Mar. 31, 2005

(65) Prior Publication Data
US 2007/0032601 A1    Feb. 8, 2007

(30) Foreign Application Priority Data
Sep. 19, 2003    (JP) ............................. 2003-328131

(51) Int. Cl.
 *B32B 27/32* (2006.01)
 *C08L 23/00* (2006.01)
 *C08L 23/08* (2006.01)
(52) U.S. Cl. ........................ 428/523; 428/500; 428/910; 525/191; 525/240
(58) Field of Classification Search ........................ None
See application file for complete search history.

(56) References Cited

U.S. PATENT DOCUMENTS

| | | | | |
|---|---|---|---|---|
| 4,000,234 A | * | 12/1976 | Pilgrim et al. ............... | 264/564 |
| 4,828,906 A | * | 5/1989 | Nishimura et al. ........... | 428/220 |
| 5,278,272 A | * | 1/1994 | Lai et al. .................. | 526/348.5 |
| 5,523,136 A | * | 6/1996 | Fischer et al. .............. | 428/35.2 |
| 5,594,071 A | * | 1/1997 | Takahashi et al. ........... | 525/240 |
| 5,674,945 A | | 10/1997 | Takahashi et al. | |
| 5,681,523 A | * | 10/1997 | Cobler et al. ................ | 264/565 |
| 5,741,861 A | * | 4/1998 | Yamamoto et al. .......... | 525/240 |
| 5,744,551 A | * | 4/1998 | Kupperblatt et al. ........ | 525/240 |
| 5,756,193 A | | 5/1998 | Yamamoto et al. | |
| 5,844,045 A | * | 12/1998 | Kolthammer et al. ....... | 525/240 |
| 6,313,226 B1 | * | 11/2001 | Yasaka et al. ................ | 525/240 |
| 6,329,465 B1 | * | 12/2001 | Takahashi et al. ........... | 525/191 |
| 6,333,387 B1 | * | 12/2001 | Takahashi et al. ........... | 525/240 |
| 6,346,576 B1 | * | 2/2002 | Takahashi ................... | 525/191 |
| 6,399,683 B1 | * | 6/2002 | Yamamoto et al. .......... | 524/115 |
| 6,492,475 B1 | * | 12/2002 | Egashira et al. ............. | 526/153 |
| 6,667,375 B1 | * | 12/2003 | Mitsuno et al. ............... | 526/90 |
| 6,713,562 B2 | * | 3/2004 | Kagami et al. .............. | 525/240 |
| 6,936,660 B2 | * | 8/2005 | Kagami et al. .............. | 525/191 |
| 7,288,596 B2 | * | 10/2007 | Kwalk ........................ | 525/191 |
| 2001/0014718 A1 | * | 8/2001 | Kagami et al. .............. | 525/240 |
| 2002/0016416 A1 | * | 2/2002 | Takahashi et al. ........... | 525/240 |
| 2002/0082353 A1 | * | 6/2002 | Takahashi ................... | 525/191 |

FOREIGN PATENT DOCUMENTS

| | | | |
|---|---|---|---|
| JP | 1-185337 | A | 7/1989 |
| JP | 6-65442 | A | 3/1994 |
| JP | 6-65443 | A | 3/1994 |
| JP | 6-136193 | A | 5/1994 |
| JP | 6-329848 | A | 11/1994 |
| JP | 8-134284 | A | 5/1996 |
| JP | 8-269256 | A | 10/1996 |
| JP | 08-283477 | * | 10/1996 |
| JP | 8-283477 | A | 10/1996 |
| JP | 2003-253064 | A | 9/2003 |
| JP | 2004-189914 | * | 7/2004 |
| JP | 2004-189914 | A | 7/2004 |

OTHER PUBLICATIONS

Schimtz, Peter et al., "Films." Ullmann's Encyclopedia of Industrial Chemistry, 5th Ed., vol. A11 (1988), pp. 85-95, 108, 110.*

* cited by examiner

*Primary Examiner*—Vivian Chen
(74) *Attorney, Agent, or Firm*—Birch, Stewart, Kolasch & Birch, LLP

(57) ABSTRACT

A polyethylene-based stretched film with a thickness in the range of 10 to 100 μm, the film comprising components (A) and (B) (the total amount of components (A) and (B) being 100 parts by weight), and has a density in the range of 898 to 960 Kg/m$^3$:

(A) 50 to 95 parts by weight of a polyethylene composition which comprises the following components (I) and (II) (the total amount of (I) and (II) being 100 parts by weight), and has a density in the range of 890 to 940 Kg/m$^3$:

(I) 5 to 95 parts by weight of an ethylene/alpha-olefin copolymer obtained by copolymerization of ethylene and an alpha-olefin having 4 to 12 carbon atoms with the use of a metallocene catalyst, which has a melt flow rate in the range of 0.01 to 10 g/10 min and a density in the range of 900 to 925 Kg/m$^3$, and, (II) 5 to 95 parts by weight of an ethylene/alpha-olefin copolymer obtained by copolymerization of ethylene and an alpha-olefin having 4 to 12 carbon atoms with the use of a metallocene catalyst, which has melt flow rate in the range of 1 to 100 g/10 min and a density in the range of 926 to 960 Kg/m$^3$; and (B) 5 to 50 parts by weight of a high-pressure low density polyethylene which has a melt flow rate in the range of 0.1 to 10 g/10 min, and a density in the range of 910 to 930 Kg/m$^3$.

2 Claims, No Drawings

RESIN COMPOSITION AND STRETCHED FILM OBTAINED BY USING THE SAME

TECHNICAL FIELD

The present invention relates to a resin composition comprising an ethylene polymer, and a stretched film obtained by using the same.

BACKGROUND ART

A stretched film made from polyethylene or a resin composition containing polyethylene as a base component has been used in various applications from the viewpoint of excellent transparency, strength characteristics, chemical resistance and bag-production processability.

However, as for a conventional stretched film obtained by using polyethylene, it is disadvantageous that the stretched film has poor strength in the stretching direction, and a bag produced therefrom is easily torn when the contents are contained in the bag, thus damaging the contents, it is difficult to perform heat sealing on the stretched film, making it difficult to form a bag-shaped product and its appearance is poor, and the like.

JP-A No. 8-134284 discloses a polyethylene-based resin stretched film obtained by stretching polyethylene obtained by using a metallocene compound in at least uniaxial direction, but since the tear strength in the MD direction is unsatisfactory, there is a need for improvement.

JP-A No. 8-269256 discloses a film for packaging heavy goods which can be obtained from a composition comprising linear low-density polyethylene, linear low-density polyethylene and high-pressure low-density polyethylene. Since this invention discloses only the use of a film obtained by inflation molding for the purpose of packaging heavy goods, it does not describe nor suggest a stretched film.

As described above, a polyethylene-based stretched film, which has excellent tear strength both in the MD and TD directions and excellent transparency, and which is uniformly stretchable, is desired. Further, a resin composition which can provide the stretched film is also desired.

[Patent Document 1] JP-A No. 8-134284
[Patent Document 2] JP-A No. 8-269256

DISCLOSURE OF THE INVENTION

Problems to be Solved by the Invention

The present invention is intended to solve the above described problems associated with the prior art and it is an object of the present invention to provide a stretched film which has high tear strength, an excellent tear strength balance in the MD and TD directions, and which is uniformly stretchable, and a resin composition which is suitable for the stretched film. Further, it is another object of the present invention to provide a stretched film which has excellent transparency and rigidity, as well as excellent impact resistance, heat sealing property, shrink packing property, and the like.

Means for Solving the Problems

The present inventors have conducted extensive studies to solve the problems, and thus they have found that a polyethylene-based stretched film satisfying specific physical property parameters has high tear strength, an excellent tear strength balance in the MD and TD directions and excellent transparency and rigidity, as well as excellent in stretch uniformity. Thus, they have accomplished the invention.

That is to say, a first aspect of the invention is,
a polyethylene-based film which is a stretched film obtained by stretching a polyethylene-based resin,
wherein (A-i) Em and Et, which represent the values of Elmendorf tear strength in the MD and TD directions, respectively, as measured in accordance with ASTM D1922, satisfy the following formulas 1, 2 and 3:

$20 \leq Em [N/cm] \leq 3000$ (Formula 1)

$20 \leq Et [N/cm] \leq 3000$ (Formula 2)

$0.1 \leq (Em/Et) \leq 3$ (Formula 3);

(A-ii) the tensile initial modulus TM in the MD direction satisfies the following formula 4:

$300 \leq TM [MPa] \leq 10000$ (Formula 4); and (A-iii) the thickness is in the range of 5 to 150 μm,
and is excellent in the stretch uniformity. As used herein, the excellent stretch uniformity means that whitening is not observed in the film when it is uniaxially stretched to a maximum stretch ratio.

The stretched film of the present invention can be obtained by forming a polyethylene-based resin composition into a thick film by an inflation method, a T-die cast method or the like, and further stretching the film. The film prior to stretching is called an "extruded film." According to the invention, the stretch direction of the extruded film is referred to as MD (machine direction), and the direction perpendicular to the stretch direction is referred to as TD (transverse direction).

The stretch ratio of the stretched film is preferably in the range of 2 to 15, and more preferably in the range of 6 to 12, from the viewpoint of good transparency and tensile modulus.

The stretched film of the invention preferably has a haze of 10% or less, as measured in accordance with ASTM D1003.

Further, the present inventors have surprisingly found that a film obtained by stretching a composition comprising a specific polyethylene-based resin has high tear strength and excellent tear strength balance in the MD and TD directions, and further excellent stretch uniformity.

That is to say, the second aspect of the invention relates to a resin composition presented in the following.

A resin composition for a stretched film,
which comprises the following components (A) and (B) (the total amount of components (A) and (B) being 100 parts by weight), and has a melt flow rate in the range of 0.1 to 100 g/10 min, and a density in the range of 898 to 960 Kg/m3:

(A) 50 to 95 parts by weight of a polyethylene composition which comprises the following components (I) and (II) (the total amount of (I) and (II) being 100 parts by weight), and has a melt flow rate in the range of 0.1 to 100 g/10 min, and a density in the range of 890 to 940 Kg/m3:

(I) 5 to 95 parts by weight of an ethylene/α-olefin copolymer obtained by copolymerization of ethylene and an α-olefin having 4 to 12 carbon atoms, which has a melt flow rate in the range of 0.01 to 10 g/10 min and a density in the range of 860 to 925 Kg/m3, and (II) 5 to 95 parts by weight of an ethylene/α-olefin copolymer obtained by copolymerization of ethylene and an α-olefin having 4 to 12 carbon atoms, which has a melt flow rate in the range of 1 to 100 g/10 min, and a density in the range of 926 to 960 Kg/m3; and (B) 5 to 50 parts by weight of a high-pressure low-density polyethylene which has a melt flow rate in the range of (0.1 to 100 g/10 min, and a density in the range of 910 to 930 Kg/m3.

It is preferable that a high-density polyethylene (C), which comprises an ethylene polymer or an ethylene/α-olefin copolymer, and has a melt flow rate in the range of 0.01 to 20 g/10 min, and a density in the range of 940 to 980 Kg/m3, is blended in an amount of 5 to 50 parts by weight based on the total 100 parts by weight of the above described components (A) and (B); provided that, the density of the high-density polyethylene (C) is greater than that of the ethylene/α-olefin copolymer (II). The difference in the densities of the high-density polyethylene (C) and the ethylene/α-olefin copolymer (II) is 5 Kg/m3 or greater, and preferably 10 Kg/m3 to 50 Kg/m3 (inclusive).

If the high-density polyethylene (C) is blended within the above range, especially the tensile modulus and the Elmendorf tear strength in the MD direction of the stretched film are excellent, thus being preferable.

The ethylene/α-olefin copolymer (I) is preferably one obtained by polymerization using a metallocene catalyst, and the ethylene/α-olefin copolymer (II) is preferably one obtained by polymerization using a metallocene or Ziegler catalyst.

By using the resin composition, the film according to the first aspect of the invention can be preferably prepared.

Further, preparation of a multi-layer film, which includes at least one layer of the stretched film according to the first aspect of the invention and the film obtained by stretching the resin composition according to the second aspect of the invention, is also carried out.

The multi-layer film can be obtained by coextruding the resin composition of an extruded film for the stretched film and the resin composition from which other layers are made, laminating by means of an extrusion lamination, a dry lamination, or the like, and further stretching the laminate. Moreover, a method wherein other layers are laminated on the previously stretched film by a dry lamination or the like is exemplified. For the stretch method, mention may be made of, for example, a method for stretching in the MD direction between a heating roller and another roller rotating at a speed different from that of the heating roller.

EFFECTS OF THE INVENTION

According to the present invention, a stretched film comprising an ethylene-based polymer having excellent properties and a resin composition for film can be obtained. Further the stretched film is characterized in that it is suitable for various applications such as a packaging material including a shrink film and the like; particularly excellent in transparency, rigidity, balance of the tear strength in the MD and TD directions, impact resistance, heat sealing property and shrink packing property; excellent in freshness preservability of the contents, appearance and cold resistance when the film is used as a packaging material; further, excellent in preservability of the contents when the film is subjected to shrinking; and the like.

BEST MODE FOR CARRYING OUT THE INVENTION

Hereinbelow, the stretched film according to the first aspect of the present invention will be described.

Em and Et are typically 20 to 3000 [N/cm], and preferably 50 to 2500 [N/cm].

The balance of the Elmendorf tear strength in the MD direction (Em) and the Elmendorf tear strength in the TD direction (Et) is such that typically $0.1 \leq (Em/Et) \leq 3$,
preferably $0.2 \leq (Em/Et) \leq 2.5$, and
more preferably $0.3 \leq (Em/Et) \leq 2$.

The stretch ratio is typically in the range of 2 to 15, and preferably in the range of 6 to 12. If the stretch ratio is within this range, the stretched film becomes uniform, has excellent transparency, and has excellent tensile modulus, thus being preferable.

The tensile initial modulus is typically 300 to 10000 MPa, preferably 500 to 8000 MPa, and more preferably 500 to 5000 MPa.

In the present invention, the tensile initial modulus is determined as follows. A dumbbell having a size in accordance with JIS K6718 was punched from a film in parallel with the take-up direction of the film, that is, in the MD direction, to provide a specimen.

The specimen was set up in air chucks of an Instron type universal tester and subjected to a tensile test under the conditions of a chuck distance of 86 mm and a pulling rate of 200 mm/min. The slope of the initial stress to the displacement is taken as the tensile initial modulus.

Stretch uniformity is identified as follows. The extruded film is uniaxially stretched between a heating roller 1 at a surface temperature of 110° C. and another roller 2 rotating at a speed different from that of the heating roller 1 to give a stretched film. The rotational speed of the roller 1 is set at 5 m/min and the ratio is adjusted with the rotational speed of the roller 2. The ratio just before generation of the break in the film as the ratio increases each time by 0.5 is taken as a maximum stretch ratio, and the maximum stretch ratio is observed by the naked eyes. Excellent stretch uniformity is defined as the state where the whitening, that is, a whitish and turbid part cannot be observed on the film. Here, it is assumed that the state where whitening on the edge of the film is excluded.

Hereinbelow, the resin composition for a stretched film according to the second aspect of the present invention will be described.

(Ethylene/α-olefin copolymer)

As used in the invention, the ethylene/α-olefin copolymer (I) is an ethylene/ (α-olefin copolymer obtained by copolymerization of ethylene and an α-olefin having 4 to 12 carbon atoms, and the ethylene/α-olefin copolymer (II) is an ethylene/α-olefin copolymer obtained by copolymerization of ethylene and an (α-olefin having 4 to 12 carbon atoms. Further, the ethylene/α-olefin copolymer (I) and the ethylene/α-olefin copolymer (II) may be those obtained by copolymerization of the same kind of (α-olefins, or different kinds of α-olefins.

The copolymer (I) is preferably polymerized with the use of a metallocene catalyst. The copolymer (II) can be obtained with the use of a metallocene catalyst or a Ziegler-Natta catalyst, and in particular, is preferably polymerized with the use of a metallocene catalyst.

For (α-olefins having 4 to 12 carbon atoms, mention may be made of, for example, butene-1, pentene-1, hexene-1, heptene-11, octene-1, nonene-1, decene-1, dodecene-1, 4-methyl-pentene-1, 4-methyl-hexene-1, vinylcyclohexane, vinylcyclohexene, styrene, norbornene, butadiene, isoprene, and the like, and preferably hexene-1, 4-methyl-pentene-1 and octene-1. The α-olefin having 4 to 12 carbon atoms may be used alone or in combination of at least two kinds.

For ethylene/α-olefin copolymers (I) and ethylene/α-olefin copolymers (II), mention may be made of, for example, an ethylene/butene-1 copolymer, an ethylene/4-methyl-pentene-1 copolymer, an ethylene/hexene-1 copolymer, an ethylene/octene-1 copolymer and the like, preferably an ethylene/hexene-1 copolymer, an ethylene/4-methyl-pentene- 1 copolymer, an ethylene/octene-1 copolymer and the like, and more preferably an ethylene/hexene-1 copolymer.

The melt flow rate (MFR) of the ethylene/α-olefin copolymer (I) is 0.01 to 10 g/10 min, preferably 0.2 to 5 g/10 min, and more preferably 0.3 to 1 g/10 min. If the melt flow rate (MFR) of the ethylene/α-olefin copolymer (I) is less than 0.01 g/10 min, the melt viscosity becomes too high, and thus the extrusion processability may be deteriorated. If the melt flow rate (MFR) exceeds 10 g/10 min, the mechanical strength may be deteriorated.

The density of the ethylene/α-olefin copolymer (I) is 860 to 925 Kg/m3, preferably 900 to 920 Kg/m3, and more preferably 903 to 920 Kg/m3. If the density of the ethylene/α-olefin copolymer (I) is within the range of 860 to 925 Kg/m3, uniform stretching would be favorably possible upon stretching the film, thus being preferable. The density of the copolymer (I) can be changed by means of the amount of the α-olefin to be copolymerized.

The melt flow rate of the ethylene/α-olefin copolymer (II) (MFR) is 1 to 100 g/10 min, preferably 2 to 80 g/10 min, and more preferably 4 to 60 g/10 min. If the MFR is 1 g/10 min or more, the extrusion processability is good. If the MFR is 100 g/10 min or less, the mechanical strength is improved, thus being preferable.

The density of the ethylene/α-olefin copolymer (II) is 926 to 960 Kg/m3, and preferably 935 to 945 Kg/m3. If the density of the ethylene/α-olefin copolymer (II) is less than 926 Kg/m3, upon performing the stretching, the uniform stretchability may be deteriorated due to the possibility of adhesion on the heating roller. If the density exceeds 960 Kg/m3, the impact strength and the transparency may be deteriorated. The density of the copolymer (II) can be changed by means of the amount of the α-olefin to be copolymerized.

(High-pressure Low-density Polyethylene)

The melt flow rate (MFR) of the high-pressure low-density polyethylene (B) used in the invention is, from the viewpoint of maintaining good extrusion processability, the mechanical strength and the transparency after heat treatment, preferably 0.1 to 10 g/10 min, more preferably 0.1 to 8 g/10 min, and even more preferably 0.2 to 8 g/10 min.

The density of the high-pressure low-density polyethylene (B) is, from the viewpoint of maintaining the rigidity of the stretched film, is preferably 915 to 935 Kg/m3, more preferably 915 to 930 Kg/m3, and even more preferably is 918 to 930 Kg/m3.

(High-density Polyethylene)

The melt flow rate (MFR) of the high-density polyethylene (C) which may be used in the invention is 0.1 to 20 g/10 min, preferably 0.1 to 10 g/10 min, more preferably 0.5 to 5 g/10 min, and even more preferably 0.1 to 3 g/10 min.

If the melt flow rate (MFR) of the high-density polyethylene is 0.1 g/10 min or more, the melt viscosity is appropriate from the viewpoint of extrusion processability, thus being preferable. If the melt flow rate (MFR) is 20 g/10 min or less, the mechanical strength is good, thus being preferable.

The high-density polyethylene (C) consists of an ethylene polymer or an ethylene/ (α-olefin copolymer. The density is in the range of 940 to 980 Kg/m3, and preferably 950 to 970 Kg/m3. If the density is less than 940 Kg/m3, the Elmendorf tear strength balance may be deteriorated.

As the high-density polyethylene (C), a high-density polyethylene having plural DSC peaks is preferred. The plural DSC peaks encompass the case where two or more peaks are observed in the DSC chart, and further the case where one peak and a shoulder accompanying therewith are observed. In accordance with JIS K 7122, measurement is carried out while raising the temperature from 10° C. to 180° C. at a heating rate of 10° C./min.

The high-density polyethylene having plural DSC peaks has a wide composition distribution, which can be obtained by performing a multi-stage polymerization, or by dry blending those having different densities.

(Process for Preparing an Ethylene/α-olefin copolymer)

As the process for preparing the ethylene/ (α-olefin copolymer (I) used in the invention, mention may be made of a well-known polymerization method using a metallocene catalyst. For the well-known polymerization method, mention may be made of, for example, a solution polymerization method, a slurry polymerization method, a high pressure ionic polymerization method, a gas phase polymerization method and the like, preferably a gas phase polymerization method, a solution polymerization method and a high pressure ionic polymerization method, and more preferably a gas phase polymerization method.

As the metallocene-based catalyst, a catalyst system comprising a transition metal compound having a group with a cyclopentadiene type anion skeleton is preferred. The transition metal compound having a group with a cyclopentadiene type anion skeleton refers to a so-called metallocene-based compound, and it is represented by, for example, the general formula $ML_aX_{n-a}$ (wherein M is a transition metal atom belonging to Group 4 or the lanthanides series in the Periodic Table. L is a group with a cyclopentadiene type anion skeleton or a group containing a heteroatom, wherein at least one cyclopentadiene type anion skeleton is included. Plural L's may be bridged each other. X is a halogen atom, hydrogen or a hydrocarbon group having 1 to 20 carbon atoms. n is the valence of the transition metal atom, a is an integer satisfying $0 < a \leq n$). The transition metal compounds may be used alone or in combination of at least two kinds.

For the above metallocene-based catalyst, organoaluminum compounds such as triethylaluminum and triisobutylaluminum, alumoxane compounds such as methylalumoxane, and/or ionic compounds such as trityl tetrakis(pentafluorophenyl)borate and N,N-dimethylanilinium tetrakis(pentafluorophenyl)borate, are used in combination.

Further, the above metallocene-based catalyst may be a catalyst in which the above metallocene-based compound, and the organoaluminum compound, the alumoxane compound and/or the ionic compound are supported or impregnated on a particulate inorganic support such as SiO2 and Al2O3, or a particulate organic polymer support such as polyethylene and polystyrene.

For the ethylene/α-olefin copolymer obtained by polymerization using the above metallocene-based catalyst, mention may be made of the ethylene/α-olefin copolymers described in JP-A No. 9-183816.

As the process for preparing the ethylene/α-olefin copolymer (II) used in the invention, mention may be made of a well-known polymerization method using a well-known polymerization catalyst. For the well-known polymerization catalyst, mention may be made of, for example, a Ziegler-Natta catalyst, a metallocene-based catalyst and the like, and preferably a metallocene-based catalyst. For the well-known polymerization method, mention may be made of the same polymerization method as the polymerization method used for the process for preparing the above-mentioned ethylene/ (α-olefin copolymer (I).

(Process for Preparing High-density Polyethylene)

As the process for preparing high-density polyethylene (C) used in the invention, mention may be made of a well-known polymerization method using a well-known polymerization catalyst. For the well-known polymerization catalyst, mention may be made of, for example, a Ziegler-Natta catalyst and the like, and for the well-known polymerization method, mention may be made of the same polymerization method as the polymerization method used for the process for preparing the above-mentioned ethylene/α-olefin copolymer (I). As the process for preparing high-density polyethylene (C), mention may be made of, for example, a slurry polymerization method using a Ziegler-Natta catalyst.

(Process for Preparing High-pressure Low-density Polyethylene)

As the process for preparing high-pressure low-density polyethylene (B) used in the invention, mention may be made of a process for polymerizing ethylene under the conditions of a polymerization pressure of 140 to 300 MPa and a polymerization temperature of 200 to 300° C. in the presence of a radical generating agent, generally using a tank reactor or a tubular reactor. As a molecular weight modifier to regulate the melt flow rate, hydrogen and hydrocarbons such as methane and ethane can be used. The high-pressure low-density polyethylene can be prepared by a well-known method, for example, the method described in Mori et al., "High Polymer Engineering," Vol. 13, p. 247 (Chijin-Shokan) (1966), and the like.

(Resin Composition)

The component (A) of the invention comprises 5 to 95 parts by weight of an ethylene/α-olefin copolymer (I) and 95 to 5 parts by weight of an ethylene/ (-olefin copolymer (II) (the total amount of (I) and (II) being 100 parts by weight). Preferably, the amount of (II) is 70 to 20 parts by weight with respect to 30 to 80 parts by weight of (I), and more preferably the amount of (II) is 20 to 60 parts by weight with respect to 40 to 80 parts by weight of (I).

If the amount of (I) is less than 5 parts by weight, the mechanical strength may be lowered and the transparency of the stretched film may be deteriorated. If the amount of (I) exceeds 95 parts by weight, the rigidity of the stretched film may be reduced.

In the resin composition of the invention, the amount of the component (B) to be blended is 5 to 50 parts by weight with respect to 50 to 95 parts by weight of the amount of the component (A) to be blended; preferably the amount of the component (B) to be blended is 10 to 50 parts by weight with respect to 50 to 90 parts by weight of the amount of the component (A) to be blended; and more preferably the amount of the component (B) to be blended is 10 to 40 parts by weight with respect to 60 to 90 parts by weight of the amount of the component (A) to be blended (In all cases, the total amount of (A) and (B) being 100 parts by weight).

If the amount of (A) is less than 5 parts by weight, the mechanical strength may be lowered and the transparency may be deteriorated. If the amount of (B) exceeds 95 parts by weight, the rigidity of the stretched film may be reduced.

The melt flow rate (MFR) of the resin composition comprising the components (A) and (B) of the invention are 0.1 to 10 g/10 min, preferably 0.2 to 4 g/10 min, and more preferably 0.3 to 3 g/10 min. If the melt flow rate (MFR) of the resin composition is less than 0.1 g /10 min, the extrusion processibility may be deteriorated, while if the melt flow rate exceeds 10 min, the mechanical strength may be lowered. If the melt flow rate (MFR) is 0.5 to 10 g/10 min, a more preferred resin composition can be obtained especially for the film molding using an inflation method upon preparing an extruded film before the stretching process, because the extrusion processibility of the resin in the film molding by an inflation method is excellent and thus bubbles become stable.

(Process for Preparing a Resin Composition)

Further, the density of the polyethylene-based resin composition used in the invention is 898 to 960 Kg/m3, preferably 900 to 950 Kg/m3, and more preferably 900 to 940 Kg/m3. If the density of the above composition is 898 to 960 Kg/m3, a film having high strength and rigidity, and having excellent tear strength balance can be obtained. If the density of the above composition is less than 898 Kg/m3, the blocking of the stretched film may be deteriorated. If the density of the above composition exceeds 960 Kg/m3, the transparency and the mechanical strength of the stretched film may be reduced.

The density of the film obtained by stretching the polyethylene-based resin composition of the invention is within the above range.

Other processes for preparing the polyethylene-based resin composition used in the invention further may be mentioned of a method of dry blending or melt blending the ethylene/α-olefin copolymer (I), the ethylene/α-olefin copolymer (II), the high-density polyethylene (C) or the high-pressure low-density polyethylene (B). For the dry blending, various blenders such as a Henschel mixer and a tumbler mixer can be used, and for the melt blending, various mixers such as a single-screw extruder, a twin-screw extruder, a Banbury mixer and a heating roller can be used.

Further, as the process for preparing the polyethylene-based resin composition used in the invention, mention may be made of, for example, the following preferable preparation processes.

1. A process wherein the ethylene/α-olefin copolymers (I) and (II), and optionally the high-density polyethylene (C) are continuously polymerized while using one polymerization reactor at the reaction conditions of two or more kinds, and then the high-pressure low-density polyethylene (B) is mixed therewith.

2. A process wherein the respective components are polymerized by a multi-stage polymerization process in a plurality of the polymerization reactors to finally obtain the polyethylene-based resin composition of the invention.

3. A process wherein any two of the respective components are prepared by a multi-stage polymerization, and then the remaining one or two components are mixed therewith.

The stretched film of the invention can be obtained by molding a polyethylene-based resin on a thick film as referred to as an extruded film, and further stretching the film. The take-up direction of the extruded film is referred to as MD, and the direction perpendicular to the take-up direction is referred to as TD. In the process prior to the stretching, for preparing an extruded film, a well-known preparation method can be used, mention may be made of for example, an inflation film molding method, a T-die cast film molding method, a calendar molding method, a press molding method, and the like, in which an inflation molding method is preferably used from the viewpoint of obtaining good stretchability at a stretch process.

The stretched film of the invention can be used as a monolayer film.

In addition, the stretched film of the invention is prepared by stretching an extruded film uniaxially or biaxially, and successively or simultaneously. Further, during the process for preparing the stretched film, the extruded film which is preliminarily stretched uniaxially or biaxially can be further stretched. In one preferable embodiment of the invention, there is provided a uniaxially stretched film which is obtained by further stretching a mono-layer film obtained by inflation molding at a stretch ratio of 2 to 15. The stretch direction of the uniaxially stretched film is preferably the same as the MD direction of the extruded film.

The thickness of the stretched film of the invention and a packaging film using the same is typically 5 to 150 micron (μm), preferably 10 to 100 micron (μm), and more preferably 10 to 80 micron (μm).

The tensile initial modulus (TM) of the stretched film of the invention is typically in the range of 300 to 10000 Mega Pascal (MPa), preferably 500 to 8000 MPa, and more preferably 500 to 5000 MPa. If the tensile initial modulus (TM) is less than 300 Mega Pascal (MPa), for example, the handling characteristics of the stretched film when used as a packaging material may be deteriorated, while if the tensile initial modulus (TM) exceeds 10000 Mega Pascal (MPa), the Elmendorf tear strength balance may be deteriorated, leading to possibly reducing the impact strength.

The ratio of the Elmendorf tear strength (ASTM D1922) in the MD and TD directions (ratio of MD/TD) of the stretched film of the invention is 0.1 to 3 (inclusive), preferably 0.2 to 2.5 (inclusive), and more preferably 0.3 to 2 (inclusive). If the ratio of the Elmendorf tear strength (ASTM D1922) (ratio of MD/TD) is less than 0.1, the impact strength may be possibly reduced.

Further, the stretched film obtained from the laminated film having at least one layer comprising the resin composition layer of the invention can be used. When the stretched film of the invention is used as at least one layer of the laminated film, as the process for preparing the laminated film, mention may be made of a coextrusion method, an extrusion coating method (which may also be referred to as an extrusion lamination method), and the like.

These films can be obtained by previously coextruding the resin composition of the extruded film for the stretched film of the invention and the resin composition from which other layers are made, laminating by means of an extrusion lamination, a dry lamination, or the like, and further stretching the laminate. Further, a method in which another layer is laminated on the previously stretched film by a method such as dry lamination or the like may be exemplified. For the stretching method, mention may be made of, for example, a method for stretching in the MD direction between a heating roller and another roller rotating at a speed different from that of the heating roller.

Further, the stretched film comprising the polyethylene-based resin composition of the invention can be laminated on a substrate, and then be used as a composite film. For the substrate, mention may be made of a well-known substrate, for example, a cellophane, a paper, a cardboard, a textile, an aluminum foil, a polyamide resin such as nylon 6 and nylon 66, a polyester resin such as polyethylene terephthalate and polybutylene terephthalate, stretched polypropylene, and the like.

In the method to laminate the stretched film of the invention on a substrate, mention may be made of a well-known method, for example, a dry lamination method, a wet lamination method, a sand lamination method, a hot melt lamination method, and the like.

To the stretched film of the invention, if necessary, other polymers, an antioxidant, a lubricant, an antistatic agent, a processibility improver, an antiblocking agent, or the like may be added. Other resins and additives may be used alone or in combination of at least two kinds.

For other polymers, mention may be made of a polyolefin-based resin other than the polyethylene-based resin used in the invention, and further a polypropylene resin which is added to improve the rigidity or the heat resistance, a polyolefin-based thermoplastic elastomer which is added to improve the impact strength, and the like. The other polymers may be added in a proportion of typically 1 to 30 parts by weight based on the total 100 parts by weight of the components (A) and (C).

For the antioxidant, mention may be made of, for example, phenol-based antioxidants such as 2,6-di-t-butyl-p-cresol (BHT), tetrakis[methylene-3-(3,5-di-t-butyl-4-hydroxyphenyl)propionate]methane (trade name: IRGANOX 1010, manufactured by Chiba Specialty Chemicals K. K.) and n-octadecyl-3-(4'-hydroxy-3,5'-di-t-butylphenyl)propionate (trade name: IRGANOX 1076, manufactured by Chiba Specialty Chemicals K. K.), phosphite-based antioxidants such as bis(2,4-di-t-butylphenyl)pentaerythritol diphosphite, tris(2,4-di-t-butylphenyl)phosphite and 2,4,8,10-tetra-t-butyl-6-[3-(3-methyl-4-hydroxy-5-t-butylphenyl)propoxy]dibenzo[d, f][1,3,2]dioxaphosphepine (trade name: Sumilizer GP, manufactured by Sumitomo Chemical Co., Ltd.), and the like.

For the lubricant, mention may be made of, for example, a higher fatty acid amide, a higher fatty acid ester, and the like; for the antistatic agent, mention may be made of, for example, glycerin ester of fatty acid having 8 to 22 carbon atoms or sorbitan acid ester, polyethylene glycol ester, and the like; for the processibility improver, mention may be made of, for example, a fatty acid metal salt such as calcium stearate, a fluorinated resin, and the like; for the antiblocking agent, mention may be made of, for example, an inorganic antiblocking agent, an organic antiblocking agent, and the like, wherein for the inorganic antiblocking agent, mention may be made of, for example, silica, calcium carbonate, talc, and the like, and for the organic antiblocking agent, mention may be made of, for example, powders of crosslinked polymethyl methacrylate, a crosslinked poly(methyl methacrylate-styrene) copolymer, crosslinked silicone, crosslinked polystyrene, and the like.

The blending proportion of the additives including these antioxidants is selected and suitably added within the range of typically 0.01 to 30 parts by weight based on the total 100 parts by weight of the components (A) and (C).

For the method for mixing other resins or additives which are added, if necessary, mention may be made of, for example, a method in which the polyethylene-based resin of the invention and other resins or additives are melt kneaded using various mixers such as a single-screw extruder, a twin-screw extruder, a Banbury mixer, and a heating roller, and provided for the film processing, a method in which the polyethylene-based resin of the invention and other resins or additives are dry blended using various blenders such as a Henschel mixer and a tumbler mixer and provided for the film processing, a method in which other resins or additives in at least one kind of master batch are dry blended with the polyethylene-based resin of the invention using various blenders such as a Henschel mixer and a tumbler mixer and provided for the film processing, and the like.

EXAMPLES

Hereinbelow, the present invention will be described in more detail with reference to Examples and Comparative Examples. However, the invention is not construed to be limited to these Examples.

The basic physical properties and film physical properties of the resin composition used in Examples and Comparative Examples are measured as follows.

[Basic Physical Properties of Resin Composition]

(1) Density (unit: Kg/m3)

The strands obtained in the measurement of the melt flow rate at 190° C. under a load of 2.16 Kg were treated at 120° C.

for 2 hours and then slowly cooled to room temperature over 1 hour, followed by measuring the density by a density gradient tube.

(2) Melt flow rate (MFR, unit: g/10 min)

The melt flow rate was measured in accordance with ASTM D1238-65T under the conditions of a temperature of 190° C. and a load of 2.16 Kg.

(3) Haze (Transparency, unit: %)

The haze was measured in accordance with ASTM D1003.

(4) Gloss (unit: %)

The gloss was measured in accordance with ASTM D1922.

(5) Elmendorf tear strength

The Elmendorf tear strength was measured in accordance with ASTM D1922 using an Elmendorf tear tester manufactured by Toyo Seiki Seisaku-sho, Ltd. A cut which is put into a film in the take-up direction is referred to as a MD direction, and a cut which is put into a film in the direction perpendicular to the take-up direction is referred to as a TD direction. Further, the tear strength balance was determined from the tear strength in the MD/the tear strength in the TD as measured herein.

(6) Tensile initial modulus

A dumbbell having a size in accordance with JIS K6718 was punched from a film to provide a specimen. A dumbbell punched in parallel with the take-up direction of the film is referred to as a MD direction, and a dumbbell punched in the direction perpendicular to the take-up direction of the film is referred to as a TD direction.

The specimen was set up in air chucks of an Instron type universal tester and subjected to a tensile test under the conditions of a chuck distance of 86 mm and a pulling rate of 200 mm/min. The slope of the initial stress to the displacement is taken as a tensile initial modulus.

The ethylene/α-olefin copolymer (I), the ethylene/α-olefin copolymer (II), the high-density polyethylene (C), and the high-pressure low-density polyethylene (B) used in Examples and Comparative Examples are as follows.

(I) Ethylene/α-olefin copolymer

Copolymer (I-a): Ethylene-hexene-1 copolymer

MFR=0.5 g/10 min, density=902 Kg/m3

Copolymer (I-b): Ethylene-hexene-1 copolymer

MFR=3.9 g/10 min, density=913 Kg/m3

(II) Ethylene/α-olefin copolymer

Copolymer (II-a): Ethylene-hexene-1 copolymer

MFR=5 g/10 min, density=940 Kg/m3

The ethylene/α-olefin copolymers (I-a) and (I-b), and the ethylene/α-olefin copolymer (II-a) as described above were those which were prepared using a well-known metallocene catalyst by a gas phase polymerization method.

(C) High-density Polyethylene

HDPE (III-a):MFR=0.11 g/10 min, density=958 Kg/m3

HDPE (III-b): MFR=5.3 g/10 min, density=962 Kg/m3

HDPE (III-c): MFR=0.3 g/10 min, density=951 Kg/m3

The above HDPE (III-a) had a DSC melting point peak having shoulders at around 131.5° C. and 129° C. HDPE (III-b) had a DSC melting point peak showing a single peak at 132.7° C. HDPE (III-c) had a single peak at 131.0° C.

(B) High-pressure low-density polyethylene

LDPE (IV-a): MFR=0.6 g/10 min, density=923 Kg/m3

The above high-pressure low-density polyethylene was prepared using a tubular reactor by a radical polymerization method.

Example 1

[Preparation of Resin Composition]

The ethylene/α-olefin copolymer (I), the ethylene/α-olefin copolymer (II), the high-density polyethylene (C) and the high-pressure low-density polyethylene (B) were dry blended with the composition shown in Table 1, and subsequently pelletized using a 46 mmφ twin-screw extruder manufactured by Ikegai Corporation at a processing temperature of 190° C. and an extrusion rate of 50 Kg/hr to give a resin composition pellet.

[Preparation of Extruded Film for Stretched Film]

The above-prepared polyethylene composition was subjected to air-cooling inflation molding to prepare a film having a thickness of 250 μm and a width of 400 mm.

<Condition for Molding of Extruded Film to be Stretched>

Molding machine: 65 mmφ Inflation molding machine manufactured by SHI Modern Machinery, Ltd.

Screw: Barrier type screw

Die: 125 mmφ(diameter), 3.5 mm (width of lip)

Air ring: two-gap type

Molding temperature: 190° C.

Extrusion rate: 77 Kg/h

Take-up speed: 7 m/min

<Condition for Preparation of Stretched Film>

The extruded film to be stretched obtained by the above process was stretched in the MD direction between a heating roller and another roller rotating at a speed different from that of the heating roller at a stretch ratio shown in Table 1 to give a stretched film. film.

If the stretch ratio is too low, the stretch becomes ununiform, thus being impossible to give a transparent film, while if the stretch ratio is too high, breaks are generated on the film. The stretch ratio just before generation of the breaks of the film as the stretch ratio increases each time by 0.5 was taken as the maximum stretch ratio.

The items other than the maximum stretch ratio were evaluated by performing the stretch at a ratio such that a transparent film can be obtained without generation of breaks. As to the stretch uniformity, upon observing the obtained film, "Good" indicates that the whole area is transparent, and "Poor" indicates that the film is partially whitened.

The melt flow rate (MFR), the density, the optical characteristic, the tensile initial modulus, the Elmendorf tear strength, the balance of the Elmendorf tear stretch, and the film impact of the obtained resin composition were evaluated and measured based on the above described methods, and the obtained results are shown in Table 1.

Example 2

Preparation of the resin composition, preparation of the extruded film, stretch processing of the film, and evaluation were carried out in the same manner as in Example 1, except that the etliylene/α-olefin copolymer (I), the ethylene/α-olefin copolymer (II), the high-density polyethylene (C), and the high-pressure low-density polyethylene (B) were used in the compositions shown in Table 1. The obtained results are shown in Table 1.

Example 3

Preparation of the resin composition, preparation of the extruded film, stretch processing of the film, and evaluation were carried out in the same manner as in Example 1, except that the ethylene/α-olefin copolymer (I), the ethylene/α-olefin copolymer (II), and the high-pressure low-density polyethylene (B) were used in the compositions shown in Table 1. The high-density polyethylene (C) was not used. The obtained results are shown in Table 1.

Comparative Example 1

Preparation of the resin composition, preparation of the extruded film, stretch processing of the film, and evaluation were carried out in the same manner as in Example 1, except that the ethylene/α-olefin copolymer (I), and the ethylene/α-olefin copolymer (II), were used in the compositions shown in Table 1. The high-density polyethylene (C) and the high-pressure low-density polyethylene (B) were not used. When the stretch ratio was set at 5.5 or less, a transparent film cannot be obtained, and when the stretch ratio exceeds 6, breaks are generated. Thus, the film obtained at a stretch ratio of 6 was used for evaluation. The obtained results are shown in Table 1.

Comparative Example 2

Preparation of the resin composition, preparation of the extruded film, stretch processing of the film, and evaluation were carried out in the same manner as in Example 1, except that the ethylene/α-olefin copolymer (I), the high-density polyethylene (C) and the high-pressure low-density polyethylene (B) were used in the compositions shown in Table 1. The ethylene/α-olefin copolymer (II) was not used. The obtained results are shown in Table 1. When the stretch ratio exceeds 6, breaks are generated, and when the stretch ratio was set at 6 or less, a transparent film could not be obtained. The film obtained at a stretch ratio of 6 was used for evaluation.

Examples 1 to 4 satisfying the requirements of the invention demonstrated that the stretchability was excellent from the viewpoint that the tensile initial modulus (MD) was 500 Mega Pascal (MPa) or more, the Elmendorf tear strength balance was 0.1 or more, the transparency was excellent, and the maximum stretch ratio was high. Among these Examples, Examples 1 and 2 in which the high-pressure polyethylene (C) and the high-pressure low-density polyethylene (B) were contained provided good results.

As compared with Examples, Comparative Example 1 in which the component (B) was not contained proved that practical applicability was poor, from the viewpoint that the Elmendorf tear strength balance and the transparency were deteriorated, as well as the tensile initial modulus was low due to the low maximum stretch ratio.

As compared with Examples, in Comparative Example 2 in which the ethylene/α-olefin copolymer (II) was not contained, the tensile initial modulus and the Elmendorf tear strength balance were comparatively good, but the maximum stretch ratio was low, and the stretch became ununiform, thus being impossible to give a transparent film.

TABLE 1

| | Polyethylene-based resin composition | Comparative example 1 | Comparative example 2 | Example 1 | Example 2 | Example 3 | Example 4 |
|---|---|---|---|---|---|---|---|
| Component (A) | Copolymer (I) | I-a | I-b | I-a | I-a | I-a | I-a |
| | (parts by weight) | 70 | 65 | 45.5 | 45.5 | 56 | 42 |
| | Copolymer (II) | II-a | — | II-a | II-a | II-a | II-a |
| | (parts by weight) | 30 | — | 19.5 | 19.5 | 24 | 18 |
| Component (B) | High-pressure low-density polyethylene | — | IV-a | IV-a | IV-a | IV-a | IV-a |
| | (parts by weight) | — | 15 | 15 | 15 | 20 | 10 |
| Component (C) | High-density polyethylene | — | III-a | III-a | III-b | — | III-c |
| | (parts by weight) | — | 20 | 20 | 20 | — | 30 |
| Ratio by weight | (I)/(II) | 70/30 | 65/0 | 70/30 | 70/30 | 70/30 | 70/30 |
| | (A)/(B) | 100/0 | 81/19 | 81/19 | 81/19 | 80/20 | 86/14 |
| Items to be measured | Unit | | | | | | |
| Stretch ratio | Times | 6 | 6 | 8 | 8 | 9 | 8 |
| Density | Kg/m$^3$ | 917 | 924 | 925 | 924 | 919 | 927 |
| MFR (190° C.) | g/10 min | 0.92 | 1.82 | 0.57 | 1 | 0.74 | 0.5 |
| Stretch temperature | ° C. | 110 | 110 | 110 | 110 | 110 | 110 |
| Thickness of film | μm | 40.7 | 40 | 28.9 | 29.3 | 23.3 | 27.3 |
| Haze of film | % | 3.8 | 5.9 | 2.1 | 2.8 | 2.0 | 1.5 |
| Gloss | % | 96 | 77 | 127 | 120 | 118 | 145 |
| Tensile initial modulus MD | MPa | 570 | 970 | 1520 | 1560 | 1280 | 1960 |
| TD | MPa | 650 | 810 | 1130 | 1070 | 860 | 1240 |

TABLE 1-continued

| | Polyethylene-based resin composition | | Comparative example 1 | Comparative example 2 | Example 1 | Example 2 | Example 3 | Example 4 |
|---|---|---|---|---|---|---|---|---|
| Elmendorf tear strength | MD | N/cm | 300 | 1360 | 1760 | 1570 | 600 | 1080 |
| | TD | N/cm | 5100 | 1800 | 1550 | 2080 | 1700 | 1190 |
| Balance of Elmendorf tear strength | | — | 0.058 | 0.76 | 1.14 | 0.75 | 0.35 | 0.91 |
| Stretch uniformity | | | Good | Poor | Good | Good | Good | Good |
| Maximum stretch ratio | | Times | 6 | 6 | 10 | 11 | 13 | 12 |

The invention claimed is:

1. A stretched film formed from a resin composition for a stretched film, wherein said film is obtained by successively or simultaneously stretching an extruded film uniaxially or biaxially, and wherein the extruded film is prepared by a method selected from the group consisting of an inflation film molding method, a T-die cast film molding method, a calendar molding method, and a press molding method, said film having a thickness in the range of 10 to 100 μm, which resin composition comprises the following components (A) and (B) (the total amount of components (A) and (B) being 100 parts by weight), and has a density in the range of 898 to 960 Kg/m$^3$:

(A) 50 to 95 parts by weight of a polyethylene composition which comprises the following components (I) and (II) (the total amount of (I) and (II) being 100 parts by weight), and has a density in the range of 890 to 940 Kg/m$^3$:

(I) 5 to 95 parts by weight of an ethylene/α-olefin copolymer obtained by copolymerization of ethylene and an α-olefin having 4 to 12 carbon atoms with the use of a metallocene catalyst, which has a melt flow rate in the range of 0.01 to 10 g/10 min and a density in the range of 900 to 925 Kg/m$^3$, and (II) 5 to 95 parts by weight of an ethylene/α-olefin copolymer obtained by copolymerization of ethylene and an α-olefin having 4 to 12 carbon atoms with the use of a metallocene catalyst, which has melt flow rate in the range of 1 to 100 g/10 min and a density in the range of 926 to 960 Kg/m$^3$; and (B) 5 to 50 parts by weight of a high-pressure low density polyethylene which has a melt flow rate in the range of 0.1 to 10 g/10 min, and a density in the range of 910 to 930 Kg/m$^3$, wherein (a-i) Em and Et, which represent the values of Elmendorf tear strength in the MD and TD directions, respectively, as measured in accordance with ASTM D1922, satisfy the following formula 3:

$$0.1 \leq (Em/Et) \leq 2.5 \quad \text{(Formula 3); and}$$

wherein (a-ii) the tensile initial modulus (TM) in the MD direction satisfies the following formula 4:

$$500 \leq TM\ [MPa] \leq 5000 \quad \text{(Formula 4).}$$

2. A stretched film as claimed in claim 1, which further comprises a high-density polyethylene (C) having a melt flow rate in the range of 0.01 to 20 g/10 min and a density in the range of 940 to 980 Kg/m$^3$ in an amount of 5 to 50 parts by weight based on the total 100 parts by weight of the components (A) and (B).

* * * * *